Figure 1:
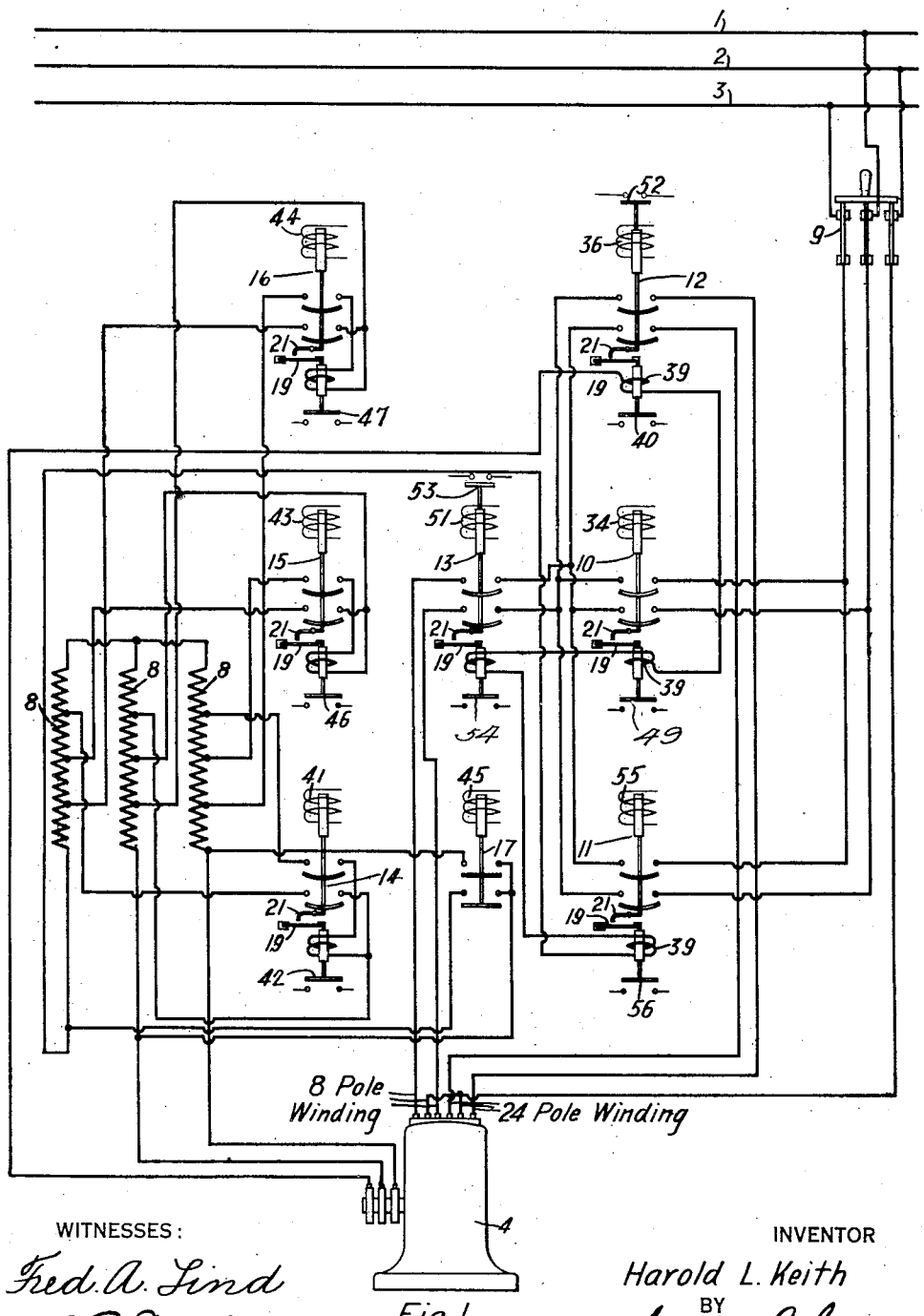

June 10, 1924.

H. L. KEITH 1,497,447

MOTOR CONTROL SYSTEM

Filed May 27, 1916    2 Sheets-Sheet 1

WITNESSES:
Fred A. Lind
J. R. Langley

INVENTOR
Harold L. Keith
BY
Wesley G. Carr
ATTORNEY

June 10, 1924.
H. L. KEITH
MOTOR CONTROL SYSTEM
Filed May 27, 1916
1,497,447
2 Sheets-Sheet 2
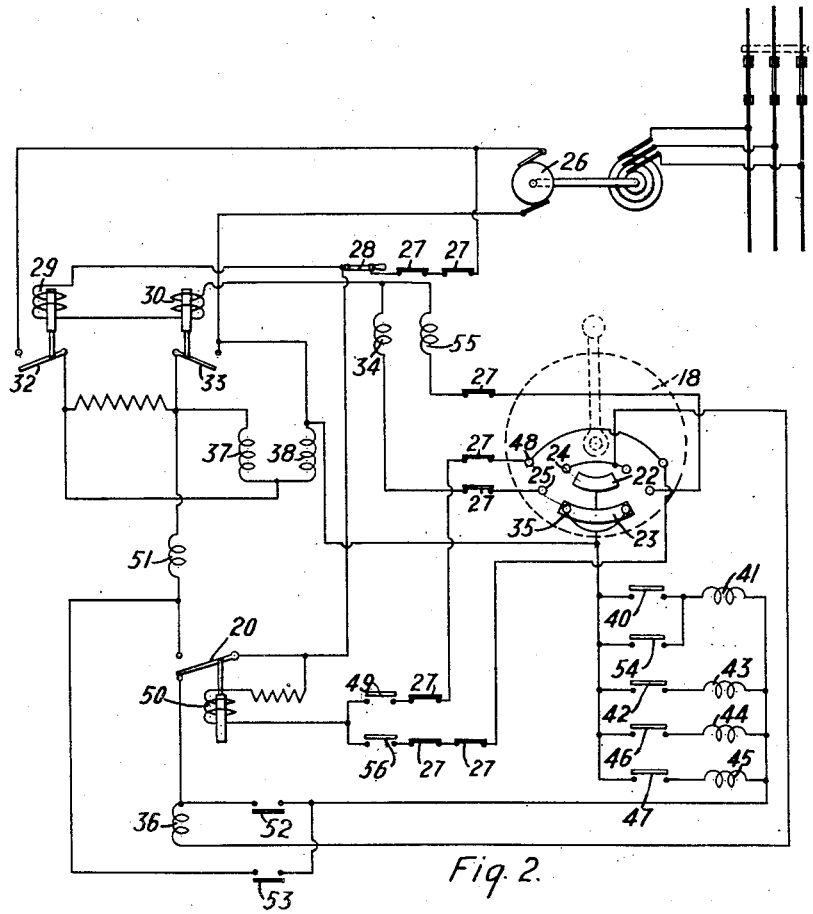
Fig. 2.
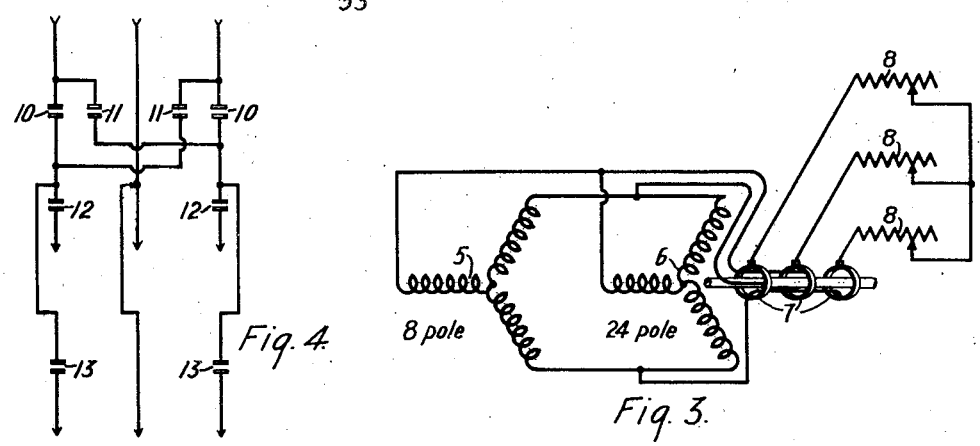
Fig. 4.
Fig. 3.
WITNESSES:
Fred. A. Lind.
J. R. Langley
INVENTOR
Harold L. Keith
BY
ATTORNEY Patented June 10, 1924.

1,497,447

UNITED STATES PATENT OFFICE.

HAROLD L. KEITH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

Application filed May 27, 1916. Serial No. 100,251.

*To all whom it may concern:*

Be it known that I, HAROLD L. KEITH, a citizen of the United States, and a resident of Edgewood Park, in the county of Allegheny and State of Pennsylvania, have invented a new and useful Improvement in Motor-Control Systems, of which the following is a specification.

My invention relates to motor-control systems and particularly to such systems as are employed in connection with elevators, hoists and similar mechanisms.

The object of my invention is to provide a simple and efficient arrangement whereby the speed of alternating-current electric motors may be increased or decreased smoothly and gradually and without shock or jar to the devices to which they are operatively connected.

In controlling the speed of alternating-current motors, it has been a usual practice to provide the primary member with a plurality of windings adapted to produce different numbers of field-magnet poles therein for operation at corresponding speeds. A resistor or a transformer is usually employed in connection with the primary windings to reduce the voltage applied to them when they are initially connected in circuit. This arrangement is comparatively complicated and expensive because of the apparatus required and the large number of conductors that are necessary.

According to the present invention, I provide an induction motor, the primary member of which is provided with two windings adapted to produce different numbers of field-magnet poles having any desired ratio to each other. The secondary member of the electric motor is provided with two windings which correspond, in the number of poles produced by them, to the respective primary windings. The terminals of each of the secondary windings are connected to variable resistors through a single set of slip rings.

The resistors are in circuit with the secondary winding that is energized when the low-speed primary winding is connected in circuit to start the motor. The resistor is then gradually shunted by automatic means to cause the motor to reach its normal speed, with the low-speed winding in circuit. The circuit of the low-speed winding is broken, the high-speed winding is connected in circuit and the resistor is, at the same time, again inserted in the secondary circuit. The resistor is gradually shunted, as before, to accelerate the motor to its normal operating speed, with the high-speed winding in circuit.

My invention will be described in connection with the accompanying drawing in which Fig. 1 is a diagrammatic view of the main circuits and apparatus embodying my invention. Fig. 2 is a similar view of the control circuits. Fig. 3 is a diagrammatic representation of the secondary circuits of the motor shown in Fig. 1. Fig. 4 illustrates a schematic arrangement of the connection of the source to the primary windings of the motor. It will be noted that the main circuits and control circuits have been illustrated in separate views for the sake of clearness.

Referring particularly to Fig. 1, line conductors 1, 2 and 3, which may be connected to any suitable source of alternating current, supply energy to an alternating-current motor 4 which is provided with two primary windings wound for eight poles and twenty-four poles, respectively, as indicated by the accompanying legends. It will be understood that the numbers of poles produced by the primary windings are taken by way of example only and that any desired ratio may exist between the numbers of poles produced by the respective windings.

As shown in Fig. 3, the secondary member of the motor 4 is provided with phase windings 5 and 6 which are respectively arranged to produce eight poles and twenty-four poles corresponding to the primary windings. The windings 5 and 6, which are in parallel relation, are connected to a single set of collector rings 7. Three variable resistors 8, which are respectively connected to the collector rings 7, are in circuit with each of the windings 5 and 6.

Referring again to Fig. 1, the primary circuits of the motor are controlled by a manually operable switch 9 and reversing switches 10 and 11 which determine the direction of the motor 4 when either of the primary windings is in circuit. The circuits of the twenty-four-pole or low-speed winding are controlled by a double-pole electromagnetic switch 12, and the circuits of the eight-pole or high-speed winding are controlled by a similar electro-magnetic switch 13. One terminal of each of the primary windings is connected to line conductor 2 directly through switch 9. The resistors 8 are shunted during the normal operation of the motor by a series of progressively operable electromagnetic switches 14, 15, 16 and 17.

Reference may now be had to Fig. 2, in which the control circuits are diagrammatically illustrated. A master switch or controller 18, which may be located within the elevator car, controls the circuits of the actuating coils of the several switches for controlling the main circuits described above in connection with Fig. 1. The actuating coil of each of the accelerating switches 14, 15, 16 and 17 is controlled by a current-limit relay that is connected to the preceding switch to close. While the relays may be connected, in any suitable manner, to the respective switches, they are, for convenience, represented as being normally held open by springs 19. The pressure of the springs 19 is released by a lever arm 21 when the corresponding accelerating switch is closed, thereby permitting the relays to close by gravity except when their actuating coils are traversed by a current which exceeds a predetermined value.

The controller 18 has two operative positions, in one of which it completes a circuit for the actuating coil of the one or the other of the reversing switches 10 and 11 and for the actuating coil of switch 12, which controls the circuit connections of the low-speed primary winding of the motor. In the second position of the controller, a circuit is partially completed for the actuating coil of what may be termed a transfer relay 20. This circuit is also controlled by the current-limit relays connected to reversing switches 10 and 11. The transfer relay 20 operates to open the circuit of the magnet coil of switch 12 and to effect the closing of switch 13 and thereby change the number of poles produced in the primary member of the motor.

It may be assumed that the various switches are in their illustrated or inoperative positions. The circuits of the primary windings of the motor are open, and the resistors 8 are in circuit with the secondary windings of the motor. It may be assumed, further, that it is desired to cause the elevator car to ascend. The operating handle of the master switch 18 is rotated in a clockwise direction, as viewed in Fig. 2, to cause movable contact segments 22 and 23 to engage stationary contact members 24 and 25, respectively.

A circuit is completed which extends from the positive terminal of a direct-current generator 26 through hatchway limit switches 27, emergency switch 28, actuating coils 29 and 30 of brake-controlling switches 32 and 33, actuating coil 34 of switch 10, hatchway limit switch 27, contact member 25, contact segment 23, and contact member 35, to the negative terminal of the generator 26.

A second circuit is completed which extends from the emergency switch 28 through transfer relay 20, which is in its lower position, as shown, actuating coil 36 of line switch 12, contact member 24, contact segments 22 and 23, and contact member 35 to the negative terminal of the generator. The coils 29 and 30 are energized to complete the circuits of the magnet coils 37 and 38 of the usual electromagnetic brakes (not shown) and thus effect the release of the brakes.

The coil 34 is energized by the circuit first traced to close reversing switch 10 in order to insure that the motor 4 will operate in the proper direction. The coil 36 is energized, also, by the second circuit to close line switch 12 and thereby complete the circuit of the twenty-four pole or low-speed winding of the motor.

At the time of starting the motor, the current traversing the secondary circuit comprising the twenty-four-pole secondary winding, the resistors 8 and coils 39 of the current-limit relays, respectively connected to switches 10, 11, 12 and 13, is of such value that the current-limit relay 40, which is connected to the switch 12, is held in its open position. The relay 40 controls the circuit of the actuating coil 41 of accelerating switch 14.

When the current traversing the secondary circuit falls to a predetermined value, the relay 40 closes to complete a circuit for the coil 41, and the switch 14 is closed to complete a shunt for one section of each of the resistors 8. A current-limit relay 42, that is mechanically connected to accelerating switch 14, controls the circuit of the actuating coil 43 of switch 15, and the latter switch is closed to shunt a second section of each resistor 8 when the current traversing the secondary circuit again falls to the predetermined value. In a similar manner, switches 16 and 17, which are provided with actuating coils 44 and 45 respectively controlled by current-limit relays 46 and 47 connected to switches 15 and 16, operate automatically in sequence in accordance with the value of the current traversing the secondary circuit to complete shunt circuits for the entire resistors 8.

The removal of the resistors from the secondary circuit gradually accelerates the motor to its normal speed, with the twenty-four-pole winding in circuit. When the controller is actuated to its second position, the contact segment 23 engages a contact member 48 but maintains its engagement with contact members 25 and 35. When the motor reaches its maximum speed, under the conditions above described, a current-limit relay 49, that is connected to reversing switch 10, closes to complete a circuit for the actuating coil 50 of transfer relay 20.

This circuit extends from the positive terminal of the generator 26 through hatchway limit switches 27, emergency switch 28, coil 50, current-limit relay 49, hatchway limit switches 27, contact member 48, contact segment 23 and contact member 35 to the negative terminal of the generator. The coil 50 is energized to actuate the transfer relay 20 to its upper position to open the circuit of the actuating coil 36 of line switch 12 and to close a circuit for the actuating coil 51 of line switch 13. This circuit extends from the relay 20, which is connected to the positive terminal of the generator 26, through coil 51 and switch 33 to the negative terminal of the generator.

The line switch 12 opens the circuit of the twenty-four-pole winding, and an interlock 52, that is connected thereto, opens to break the circuits of the coils 41, 43, 44 and 45 of the corresponding accelerating switches 14, 15, 16 and 17. The entire resistors 8 are thus inserted in circuit with the secondary windings of the motor.

The line switch 13 closes to complete the circuit of the eight-pole or high-speed winding. The eight-pole secondary winding is now energized and substantially no current traverses the twenty-four pole secondary winding because the various electromotive forces impressed upon its conductors are substantially equal and in opposite directions. An interlock 53, that is connected to the switch 13, again completes the circuit of actuating coil 41 of accelerating switch 14 when the current-limit relay 54, connected to the line switch 13, closes in response to a decrease in the current traversing the secondary circuit to a predetermined value. The accelerating switches operate automatically in the same manner as described above in connection with the low-speed winding to accelerate the motor to its normal operating speed, with the high-speed winding connected in circuit.

The operation of accelerating the motor has been described upon the assumption that the controller is operated step-by-step in accordance with the speed of the motor. It will be understood, however, that the controller handle may be actuated quickly from its "off" position to its full-speed position, and the various switches will operate automatically in tne same order as that described above to accelerate the motor. The transfer relay 20 cannot operate to change the line connections from one primary winding to the other until the motor has reached its normal speed, with the low-speed winding connected in circuit. The accelerating switches operate automatically upon the current traversing the secondary circuit falling to predetermined values and are caused to repeat their operation when one line switch is opened and the other is closed by the operation of the transfer relay.

To decrease the speed of the motor, the operating handle may be actuated toward its inoperative position. When it occupies its intermediate position, the circuit of the coil 50 of relay 20 is broken at contact member 48. The transfer relay 20 falls to its lower position to open the circuit of the actuating coil 51 of line switch 13 and to establish the circuit for actuating coil 36 of line switch 12. The interlock 53 opens the circuits of the actuating coils of the accelerating switches to insert the resistors 8 in the secondary circuit. The circuit of coil 41 of switch 14 is again established by the interlock 52 connected to line switch 12. The accelerating switches close in order as the current traversing the secondary circuit falls to predetermined values. If the secondary current does not rise to the predetermined value at which the relays 40, 42, 46 and 47 are held open, the switches close immediately.

At the instant the change in connections from the eight-pole primary winding to the twenty-four-pole winding occurs, the motor is operating above the synchronous speed for this connection. As an induction motor driven above synchronous speed operates as a generator, an electrical braking action is provided which quickly retards the motor and the elevator car. The insertion of the resistors in the secondary circuit during the change in connections and the step-by-step removal of the resistors effect a gradual reduction from the higher synchronous speed to the lower synchronous speed. The speed of the car may thus be quickly reduced from, for example, 400 feet to 120 feet per minute without shock or jar.

To stop the motor, the controller is actuated to its "off" position. The control circuits are thus opened, and the motor is disconnected from the line. The switches 32 and 33 open the circuits of the brake coils 37 and 38 to permit the application of the mechanical brakes. The car is thus brought easily and smoothly to rest. The opening of the control circuits effects the opening of the accelerating switches, and the resistors are inserted in the secondary circuit in preparation for the succeeding operation of the motor.

To cause the motor to rotate in the opposite direction to lower the elevator car, it is only necessary to actuate the controller handle in the opposite direction from its "off" position to effect the closing of reversing switch 11 which is provided with an actuating coil 55 and a current-limit relay 56. The sequence of operations is otherwise the same as previously described in connection with the ascent of the car. In case the operator neglects to stop the motor before the car reaches either of its limits of travel, the hatchway limit switches 27 may be opened by any usual or suitable mechanical means controlled by the car to open the control circuits in the same sequence as if the controller handle were thrown to its off position. The car is thus automatically and gradually brought to a stop. In case it is impossilbe to stop the car by means of the master switch 18, it is only necessary to open the manually operable emergency switch 28, whereupon, all of the control circuits are de-energized and the car is brought to rest upon the opening of all of the main and control switches and the application of the brakes.

While I have shown and described my invention as employed in connection with a three-phase induction motor having windings of a particular type and producing numbers of poles bearing a certain ratio to each other, it will be understood that the various features are shown by way of example only, and that any other suitable arrangement may be substituted therefor. The control circuits are shown and described as being controlled by means of direct current, but it will be obvious that alternating current may be employed by providing electromagnets of a character suitable for such use. Many modifications will occur to those skilled in the art to which my invention appertains, and it is understood that such changes may be made as fall within the scope of the appended claims without departing from the spirit of my invention.

I claim as my invention:

1. In a motor-control system, the combination with a motor having a primary member adapted to produce different numbers of field-magnet poles and a controller, of means operable, when the controller occupies one position, to arrange the motor connections to produce one number of poles and to accelerate the motor, and, when the controller occupies a second position, to arrange the motor connections to produce another number of poles and to further accelerate the motor, said means comprising a relay operable when the current traversing the secondary circuit of the motor falls to a predetermined value.

2. In a motor-control system, the combination with a motor having a primary member adapted to produce different numbers of field-magnet poles and a controller, of means operable, when the controller occupies one position, to arrange the motor connections to produce one number of poles and to accelerate the motor, and, when the controller occupies a second position, to arrange the motor connections to produce another number of poles and to further accelerate the motor, said means comprising a relay operable when the current traversing the secondary circuit of the motor falls to a predetermined value, and a series of progressively actuated electromagnetic switches controlled by said relay.

3. In a motor-control system, the combination with a motor having a primary member adapted to produce different numbers of field-magnet poles and a controller, of means operable, when the controller occupies one position, to arrange the motor connections to produce one number of poles and to accelerate the motor, and, when the controller occupies a second position, to arrange the motor connections to produce another number of poles and to further accelerate the motor, said means comprising a relay operable when the current traversing the secondary circuit of the motor falls to a predetermined value, a resistor, and a series of electromagnetic switches for controlling said resistor.

4. In a motor-control system, the combination with an electric motor having a primary member adapted to produce a plurality of numbers of field-magnet poles and a controller, of a switch for arranging the motor connections to produce one number of poles and a plurality of progressively actuated switches for controlling the resistance of the secondary circuit of said motor when the controller occupies one position, and a current-limit relay for changing the number of poles produced in the primary member and for controlling said progressively actuated switches when the controller occupies a second position.

5. The method of controlling the speed of an alternating-current motor which consists in producing a number of field-magnet poles in the primary member of said motor, increasing the number of poles in the primary member and, at the same time, increasing the resistance of the secondary circuit of the motor and then gradually decreasing the resistance of the secondary circuit.

6. In a motor-control system, the combination with an electric motor having low-speed and high-speed primary windings, of means operable to connect the low-speed winding in circuit and to automatically accelerate said motor, and then to connect the high-speed winding in circuit and to automatically accelerate the motor, said means comprising a current-limit relay for controlling the connections of said windings.

7. In a motor-control system, the combination with an electric motor having a primary member adapted to produce a plurality of numbers of field-magnet poles and a secondary member, of a resistor in circuit with said secondary member, means for energizing said primary member, and means operated by the current traversing said secondary member for controlling said resistor and the number of field-magnet poles.

8. The combination with an electric motor having a primary member adapted to produce different numbers of poles and a secondary member, of a pair of switches for connecting said primary member to produce one or another of said numbers of poles, a transfer switch for rendering one of said pair of switches ineffective and the other of said pair of switches effective, and means for controlling said transfer switch in accordance with the current traversing said secondary member.

9. The combination with an electric motor having a primary member adapted to produce different numbers of field-magnet poles and a secondary member having a resistor in circuit therewith, of means for controlling the connections of said primary member, said means comprising a switch for connecting said primary member to produce one of said numbers of poles, a switch for short-circuiting said resistor, and a pair of switches mechanically connected to said connecting switch for controlling said short-circuiting switch.

10. The combination with an electric motor having a primary member adapted to produce different numbers of field-magnet poles and a secondary member having a resistor in circuit therewith, of a pair of switches for connecting said primary member to produce one or another of said numbers of poles, a plurality of progressively actuated switches for short-circuiting said resistor, each having an actuating coil, a switch mechanically connected to each of said connecting switches for controlling the circuit of the first of said short-circuiting switches to close, a switch mechanically connected to each of said short-circuiting switches except the last to close for controlling the circuit of the next succeeding switch to close, and a switch mechanically connected to each of said connecting switches for controlling the circuits of all of said coils.

11. The combination with a source of energy and an electric motor having a member adapted to produce different numbers of poles and a resistor, of a pair of switches for respectively connecting said motor to said source and for short-circuiting said resistor, a pair of switches for connecting said member to produce one or another of said numbers of poles, a transfer switch for rendering one or another of said second-named pair of switches effective and a switch mechanically connected to one of said first-named pair of switches for controlling said transfer switch.

12. The combination with an electric motor having primary windings adapted to produce different numbers of field-magnet poles, and a source of current for said motor, of a pair of reversing switches for connecting said motor to said source, each having an actuating coil, a pair of switches for connecting said windings to produce one or another of said numbers of poles, each having an actuating coil, a transfer relay having two operative positions in each of which it controls the circuit of one of the coils of said second-named switches, a current-limit switch mechanically connected to each of said reversing switches for controlling the circuit of said relay coil, and a controller for closing the circuits of said coils.

13. The combination with an electric motor having a primary member adapted to produce different numbers of field-magnet poles, a source of current and a brake for said motor, and a switch for connecting said motor to said source having an actuating coil in circuit with said brake, of means for closing the circuit of said brake and said coil, a pair of switches for connecting said primary member to produce one or another of said numbers of poles, a transfer switch having two operative positions in each of which it controls one of said pair of connecting switches, and means for actuating said transfer switch to render one of said pair of switches ineffective and the other of said pair of switches effective while maintaining the circuit of said brake and said coil closed.

14. In a controller for electric motors having separate slow speed and high speed windings, in combination, separate control switches for the motor windings, common reversing means for the motor windings separate from said switches, said reversing means and said switches co-operating to connect the motor windings in circuit selectively for operation of the motor at selective speeds in either direction, and controlling means for said switches providing for operation of the slow speed switch prior to operation of the high speed switch.

15. In a controller for electric motors having separate slow and high speed windings, in combination, an electro-responsive slow speed switch controlling the former winding, an electro-responsive high speed switch controlling the latter winding, electro-responsive reversing switches common to said windings, and control means to effect selective energization of said reversing switches and also of said control switches for operation of the motor in either direction and at either or two speeds.

16. In a controller for electric motors having slow speed and high speed windings, in combination, separate control switches for the motor windings, reversing means for the motor windings operable independently of said switches, said reversing means and said switches co-operating to connect the motor windings in circuit selectively for operation of the motor at selective speeds in either direction and means rendering the slow speed switch operable immediately upon operation of said reversing means while delaying operation of the high speed switch.

17. In a controller for a motor having separate slow and high speed windings, in combination, means to connect such windings in circuit selectively and to insure connection of the slow speed winding prior to connection of the high speed winding and means to effect acceleration of the motor upon connection of said slow speed winding and to delay connection of the high speed winding pending such acceleration of the motor.

18. In a controller for a motor having separate slow and high speed windings, in combination, means to connect such windings in circuit selectively and to insure connection of the slow speed winding prior to connection of the high speed winding and means to effect acceleration of the motor upon connection of said slow speed winding and to delay connection of the high speed winding pending such acceleration of the motor, said last mentioned means also acting to accelerate the motor upon connection of the high speed winding.

19. In a controller for an alternating current motor having separate slow speed and high speed primary windings to be connected in circuit selectively, in combination, selecting means for such windings insuring connection of the slow speed winding prior to connection of the high speed winding and accelerating means for the motor acting upon the secondary circuit thereof and rendering connection of the high speed winding dependent upon prior accelerating operation thereof.

In testimony whereof, I have hereunto subscribed my name this 25th day of May 1916.

HAROLD L. KEITH.